(12) United States Patent
Ballard et al.

(10) Patent No.: US 6,187,328 B1
(45) Date of Patent: *Feb. 13, 2001

(54) SECTIONAL BAIT STATION

(75) Inventors: James Bruce Ballard, Medford; Elleen Patricia Mc Gorman, Great Meadows, both of NJ (US)

(73) Assignee: FMC Corporation, Philadelphia, PA (US)

( * ) Notice: Under 35 U.S.C. 154(b), the term of this patent shall be extended for 0 days.

This patent is subject to a terminal disclaimer.

(21) Appl. No.: 09/241,489

(22) Filed: Feb. 1, 1999

Related U.S. Application Data

(63) Continuation of application No. 08/794,097, filed on Feb. 3, 1997, now Pat. No. 5,927,001.

(51) Int. Cl.[7] .................................................. A01N 25/08
(52) U.S. Cl. ........................ 424/409; 424/405; 424/406; 424/407; 424/410; 424/411; 424/412; 424/413; 424/84; 43/131
(58) Field of Search .......................... 43/167, 121, 131, 43/132.1; 424/405–407, 409, 410–413; D1/DIG. 11, 84

(56) References Cited

U.S. PATENT DOCUMENTS

| 3,249,501 | * | 5/1966 | Lund | 167/48 |
|---|---|---|---|---|
| 5,531,981 | * | 7/1996 | Kuwazura et al. | 424/45 |
| 5,676,960 | * | 10/1997 | Myles | 424/410 |
| 5,901,496 | | 5/1999 | Woodruff | 43/124 |
| 5,927,001 | * | 7/1999 | Ballard | 43/131 |
| 5,950,356 | | 9/1999 | Nimocks | 43/131 |
| 6,003,266 | | 12/1999 | Woodruff | 43/124 |
| 6,023,879 | | 2/2000 | Katz et al. | 43/131 |
| 6,058,646 | | 5/2000 | Bishoff et al. | 43/131 |

FOREIGN PATENT DOCUMENTS

WO 93/23998  12/1993 (WO).

* cited by examiner

*Primary Examiner*—Neil S. Levy
(74) *Attorney, Agent, or Firm*—FMC Corporation

(57) ABSTRACT

The invention provides a method and apparatus for detecting and controlling termites. The invention uses a tubular body with a triangular cross section to hold a cellulose bait impregnated with a slow acting toxicant. The tubular body is placed partly in the ground so that the length of the tubular body is along the surface of the ground. The top of the tubular body is transparent so that one can easily view the bait through the top of the tubular body.

20 Claims, 3 Drawing Sheets

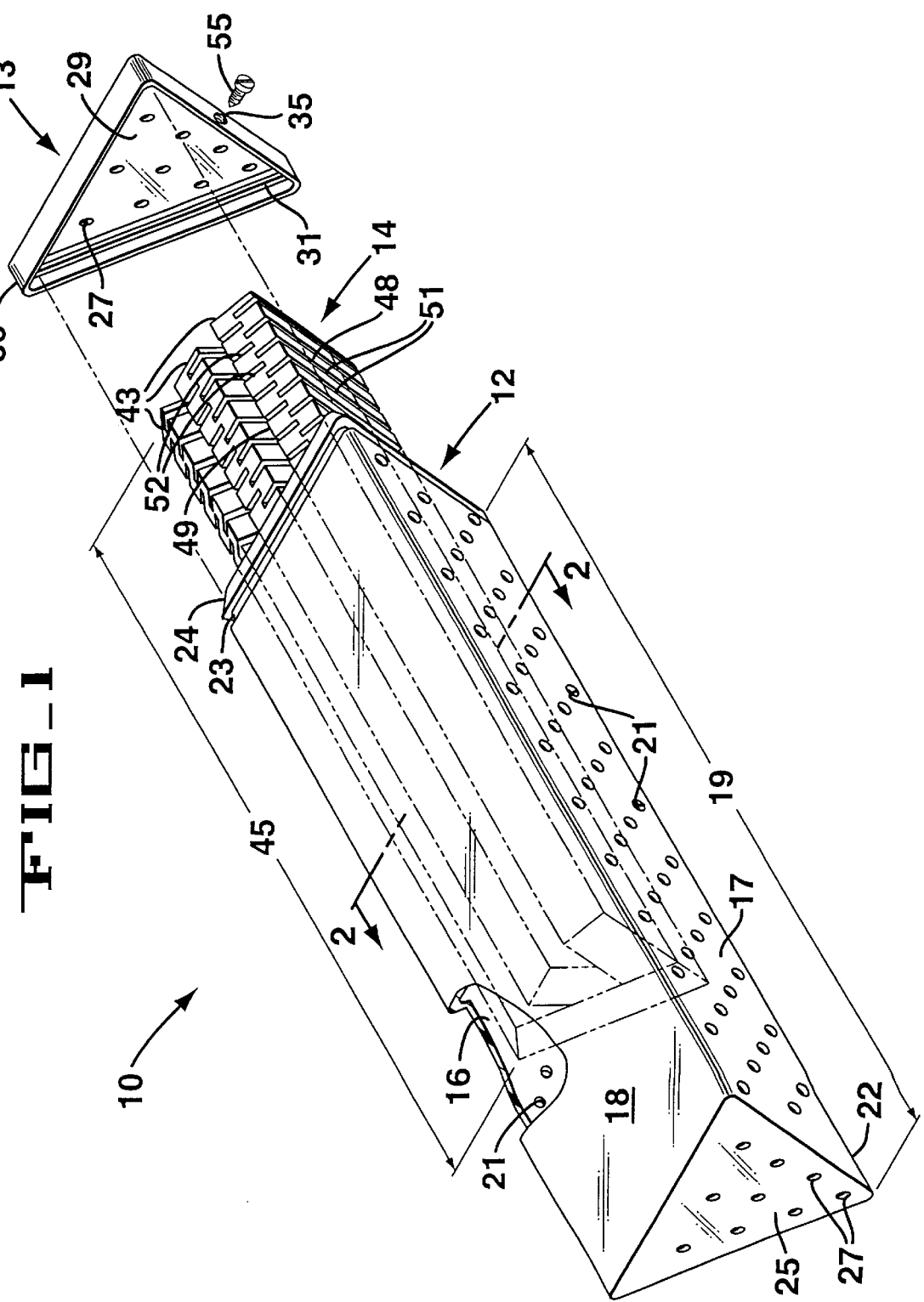

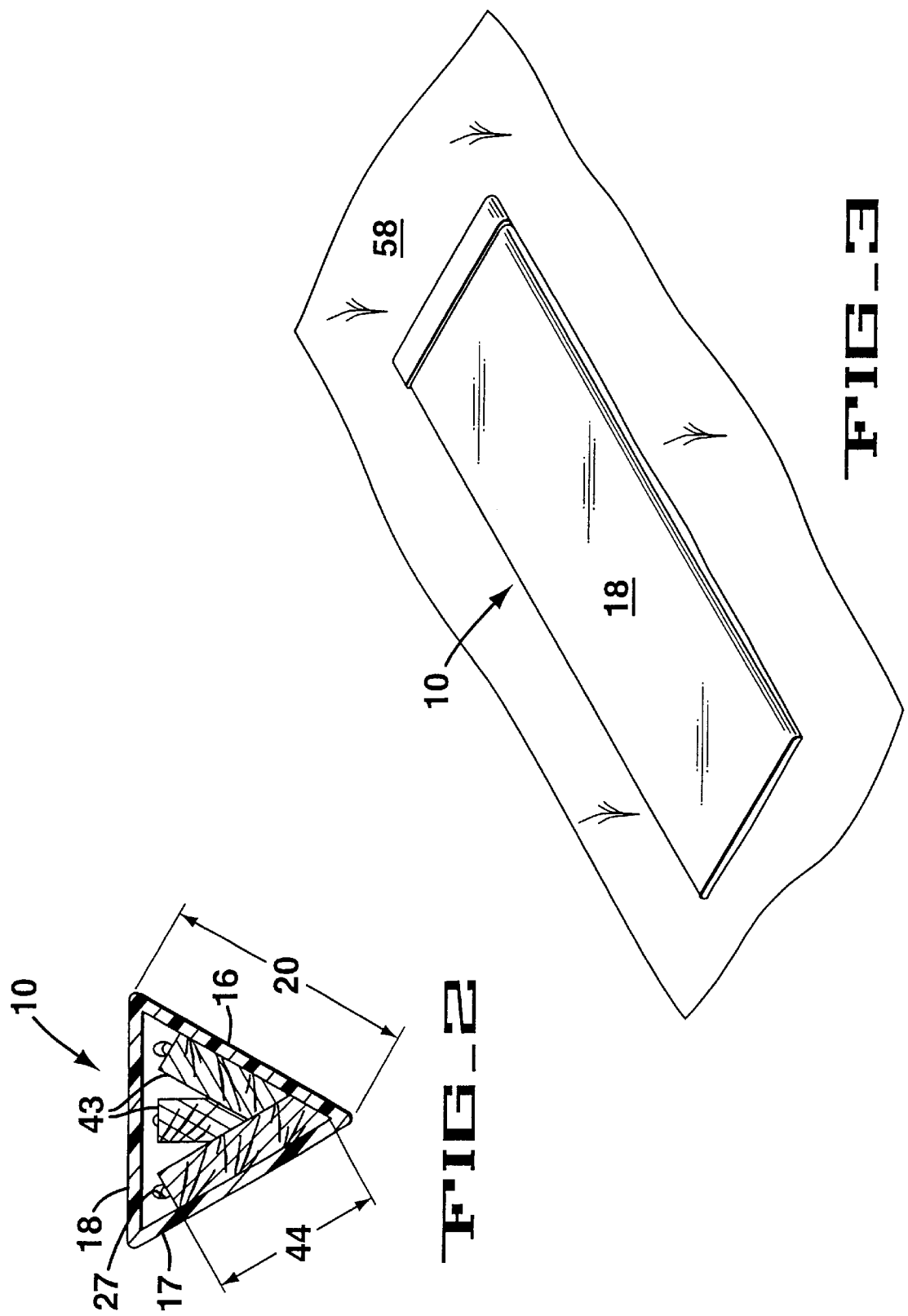

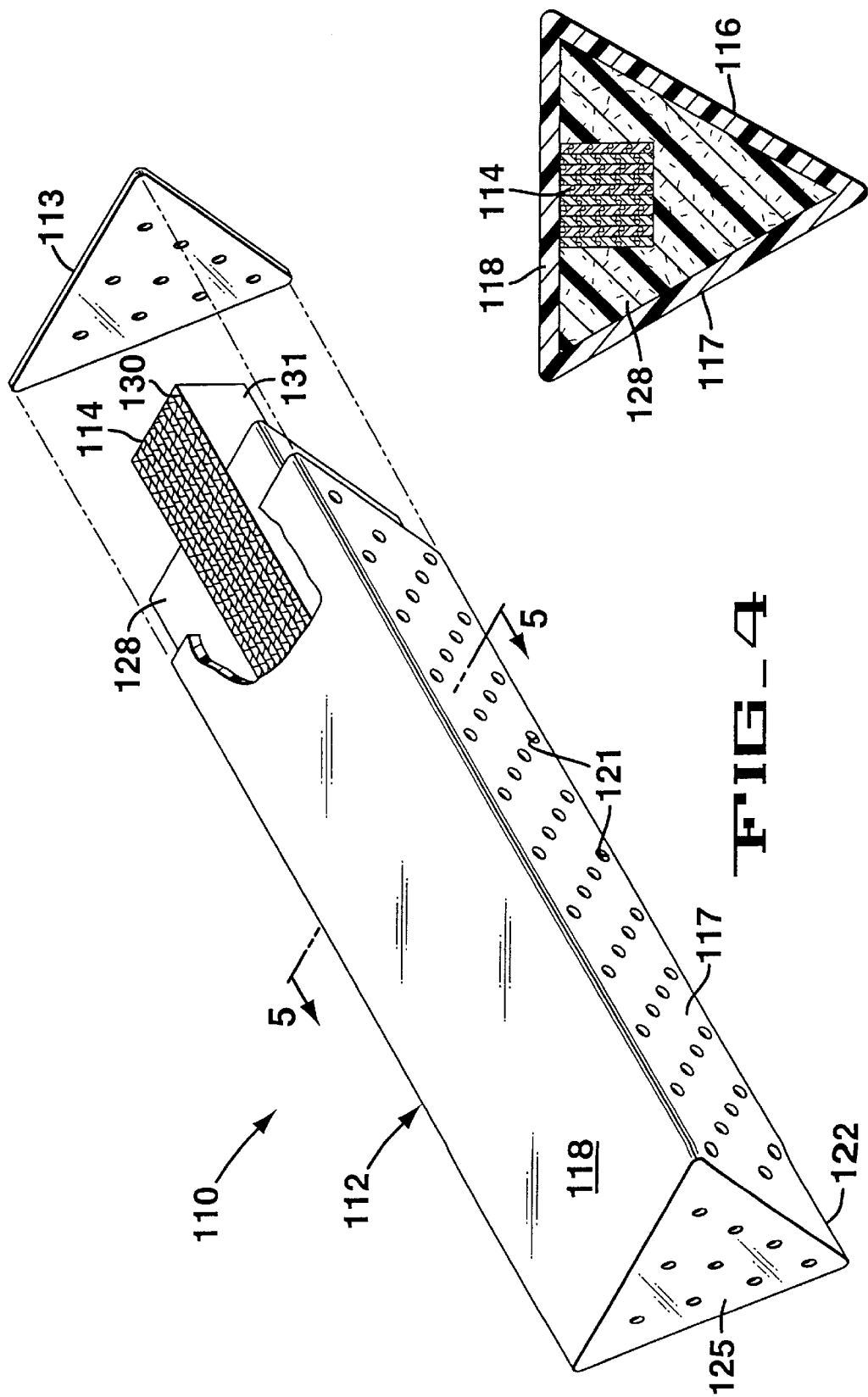

SECTIONAL BAIT STATION

This application is a Continuation of Ser. No. 08/794,097 filed Feb. 3, 1997 now U.S. Pat. No. 5,927,001.

BACKGROUND OF THE INVENTION

The present invention relates generally to the control of termites and other social insects. In particular, the present invention relates to the control of such insects using an apparatus containing bait impregnated with a slow acting toxicant. For a discussion of social insects, see generally U.S. Pat. No. 5,152,992. That patent is incorporated by reference herein to the extent it discusses social insects and their habits.

In the prior art, various techniques of applying fast acting insecticides in, around, and under a structure are used to eliminate social insects such as termites in the structure. For eliminating social insects in the ground vertical tubular stations were used.

SUMMARY OF THE INVENTION

It is an object of the invention to provide an apparatus and method for eliminating social insects in the ground.

The invention uses a cellulose bait impregnated with a slow acting toxicant held in a tubular container with a triangular cross section, which is placed horizontally in the ground. The tubular container and bait are designed to allow easy inspection of the bait without opening or moving the tubular container.

BRIEF DESCRIPTION OF THE DRAWINGS

FIG. 1 is an exploded view of a preferred embodiment of the inventive bait station.

FIG. 2 is an sectional view of the inventive bait station shown in FIG. 1, along lines 2—2.

FIG. 3 is a perspective the inventive bait station placed in the ground.

FIG. 4 is an exploded view of a bait station used in another embodiment of the invention.

FIG. 5 is a cross-sectional view of the bait station in FIG. 4 along cut lines 5—5.

DESCRIPTION OF THE PREFERRED EMBODIMENTS

FIG. 1 is an exploded view of a preferred embodiment of the inventive bait station 10. FIG. 2 is an sectional view of the inventive bait station 10 shown in FIG. 1, along lines 2—2. The bait station 10 comprises a tubular body 12 and a cap 13. A cellulose bait 14 impregnated with a slow acting toxicant is placed in the bait station 10.

The tubular body 12 has a first side wall 16, a second side wall 17, and a top wall 18, mechanically connected together to form the tubular body 12 with a triangular cross section. The first side wall 16, second side wall 17 and top wall 18 are rectangular, and have the same length 19. In this embodiment, the length 19 of the first side, second side, and top walls 16, 17, 18 is 31 centimeters. In other embodiments the length may range from 2.5 centimeters to 1 meter. The first side wall 16 and second side 17 wall have the same width 20. In this embodiment the width 20 of the first and second side walls 16, 17 is 7 centimeters. In other embodiments, the width may range from 1 centimeter to 30 centimeters, with the length 19 always being greater than or equal to the width 20. The first side wall 16 and the second side wall 17 have a plurality of apertures 21. The apertures 21 are preferably between 1 and 6 millimeters in diameter. The apertures 21 may be between 0.5 and 12 millimeters in diameter. An end wall 25 has a triangular shape and is mechanically connected to first ends of the first wall 16, second wall 17, and top wall 18. In the preferred embodiment, an adhesive is used to mechanically connect the end wall 25 to the first side wall 16, the second side wall 17, and the top wall 18. The top wall 18 is transparent. In the preferred embodiment, the first side wall 16, the second side wall 17 and the top wall 18 are mechanically connected together by forming the first side wall 16, the second side wall 17 and the top wall 18 out of a single transparent sheet, which is bent to provide three edges, thus forming a tubular body with a triangular cross section, wherein the edges define the first side wall 16, the second side wall 17, and the top wall 18. An open end is opposite from the end wall 25, formed by unbound edges of the first side wall 16, the second side wall 17, and the top wall 18. A bottom edge 22 is the edge where the first side wall 16 joins the second side wall 17. A groove 23 is place adjacent to the open end of the tubular body 12, across the widths of the first side wall 16, second side wall 17, and top wall 18. The groove 23 has a substantially rectangular cross-section. The edge of the open end has a beveled surface 24 around the open end of the tubular body 12.

The cap 13 has a triangular end wall 29. Along the edges of the triangular end wall 29 is an outer flange 30 mechanically connected to the end wall 29. Within the outer flange 30 is a ridge 31. In this embodiment, an adhesive is used to mechanically connect the outer flange 30 to the end wall 29 of the cap 13. The outer flange 30 and the end wall 29 may also be molded from a single piece. A screw hole 35 is placed through the outer flange 30.

The cellulose bait 14 comprises one or more blocks 43 of a cellulose material. The width 44 of the blocks 43 is less than the width 20 of the first side wall 16 and second side wall 17. The blocks 43 have a length 45 which is longer than the width 44 of the blocks 43. A first side 48 of the block 43 extends along the width 44 and length 45 of the block 43. A second side 49 of the block 43 is opposite from the first side 48 and extends along the width 44 and length 45 of the block 43. A first plurality of slots 51 are cut into the first side 48 of the block 43, where the first plurality of slots 51 are parallel to each other and spaced apart from each other. A second plurality of slots 52 are cut into the second side 49 of the block, wherein the second plurality of slots 52 are parallel to each other and spread apart from each other and where the second plurality of slots 52 alternate with the first plurality of slots 51 as shown. The first and second plurality of slots 51, 52 have a width of 3 centimeters. In other embodiments, the first and second plurality of slots 51, 52 have a width in the range between 0.5 centimeters and 7 centimeters. FIG. 2 shows how three blocks 43 of the cellulose material are placed in the bait station 10.

The cellulose bait 14 is impregnated with a slow acting toxicant. The slow acting toxicant may be any toxicant that requires more than 24 hours and less than 6 months after ingestion of a termiticidally effective amount to kill a termite. Slow acting toxicants useful in the present invention include, but are not limited to: boric acid/borate, hydramethylnon, macrolide antibiotics (e.g., spinosyn A and/or D, and abamectin), insect growth regulators such as molting disrupters or juvenile hormone agonists/antagonists, biological agents (i.e., living organisms or their reproductive stages), protozoacides, known termiticides, slow acting poisons or mixtures thereof. Specific examples of molting disrupters include chitin inhibitors, particularly benzoylureas such as hexaflumuron.

In operation, the bait 14 is placed in the tubular body 12. The blocks 43 are positioned, so that the length 44 of the blocks 43 is along the length 19 of the tubular body 12, and the width 44 of the blocks 43 extends along a direction from the top wall 18 to the bottom edge 22, as shown in FIG. 2. The cap 13 is placed over the open end of the tubular body 12 so that the outer flange 30 surrounds part of the first, second, and top walls 16, 17, 18. The ridge 31 slides into and locks with the groove 23 securing the cap 12 to the tubular body 12. A screw 55 is placed through the screw hole 35 in the outer flange 30 to further secure the cap 13 to the tubular body 12. The bait station 10 is placed horizontally in the ground, so that the length 19 of the first side wall 16 is horizontal with the ground, as shown in FIG. 3. The bait station 10 may be pushed directly into soft ground, or a trench as long as the length 19 of the first side wall 16 is dug. The bottom edge 22 is positioned at the bottom of the bait station 10 in the ground, and the top wall 18 is positioned at the top of the bait station 10, slightly above or almost even to the surface of the ground 58. The triangular cross section makes it easier to place the bait station 10 in the ground.

Once in the ground, the bait station 10 is able to intercept termites which travel underground in a horizontal direction. The termites enter the bait station 10 through the apertures 21, which are holes ⅛ inches in diameter. Once inside, the termites begin to build termite tubes to the cellulose bait 14. The termites eat the bait, taking in the slow acting toxicant. The termites go back to the colony before the slow acting toxicant kills the termite, and share the bait with the rest of the colony. This provides the slow acting toxicant to the colony, thus killing the whole colony. Therefore the invention provides a means for controlling a termite colony. The controlling of a termite colony means any of the following: the killing of the whole colony, or stopping the destruction caused by the colony, or substantially eliminating the colony.

The first and second plurality of slots 51, 52 enhances the baits 14 attractiveness to termites, since it is easier to build termite tubes in slots of such size. In addition, the position of the slots allows one to see through the top wall 18 and inspect the bait 14 for the presence of termites and termite tubes without moving or touching the bait 14 or station 10. The horizontal positioning also allows the easy inspection of the bait 14, which cannot be done with bait stations where the length of the station is positioned vertically in the ground.

Because termites tend to travel horizontally, just below the surface of the ground, placing the length of the bait station 10 horizontally, allows the bait station 10 to provide a greater area of protection. A plurality of bait stations 10 may be placed end to end to provide a linear barrier, such as a circle around a house. In addition to making it easier to place the bait station 10 in the ground, the triangular cross section and the absence of uncovered holes in the top wall 18 helps to keep water from reaching the apertures in the first and second side walls 16, 17. The apertures 27 in the end wall 25 and the cap end wall 29 are angled downward as shown in FIG. 2 so that water passing downward from the surface of the ground to the bottom edge 22 on the out side of the station will not enter the apertures in the end wall 25. The positioning of the apertures also help to keep soil out of the tubular body 12.

FIG. 4 is an exploded view of a bait station 110 used in another embodiment of the invention. FIG. 5 is a cross-sectional view of the bait station 110 in FIG. 4 along cut lines 5—5. The bait station 110 comprises a tubular body 112 and a cap 113.

The tubular body 112 has a first side wall 116, a second side wall 117, and a top wall 118, mechanically connected together to form the tubular body 112 with a triangular cross section. The first side wall 116, second side wall 117 and top wall 118 are rectangular, and have the same length. The first side wall 116 and second side 117 wall have the same width. The first side all 116 and the second side wall 117 have a plurality of apertures 121. An end wall 125 has a triangular shape and is mechanically connected to first ends of the first wall 116, second wall 117, and top wall 118. In this preferred embodiment, the end wall 125 to the first side wall 116, the second side wall 117, and the top wall 118 are mechanically connected by forming the first side wall 116, the second side wall 117, the top wall 118 and the end wall 125 from a single molded piece of transparent plastic. An open end is opposite from the end wall 125, formed by unbound edges of the first side wall 116, the second side wall 117, and the top wall 118. A bottom edge 122 is the edge where the first side wall 116 joins the second side wall 117.

A cardboard bait 114 impregnated with a slow acting toxicant is placed in a bait holder 128, which is placed in the bait station 110. The slow acting toxicant may be any toxicant that requires more than 24 hours and less than 6 months after ingestion of a termiticidally effective amount to kill a termite. Slow acting toxicants useful in the present invention include, but are not limited to: boric acid/borate, hydramethylnon, macrolide antibiotics (e.g., spinosyn A and/or D, and abamectin), insect growth regulators such as molting disrupters or juvenile hormone agonists/antagonists, biological agents (i.e., living organisms or their reproductive stages), protozoacides, known termiticides, slow acting poisons or mixtures thereof. Specific examples of molting disrupters include chitin inhibitors, particularly benzoylureas such as hexaflumuron.

In this preferred embodiment, the bait holder is made of a rigid foam, such as Styrofoam™, which is a rigid polystyrene plastic. The bait holder 128 has a generally triangular cross section so that it fits into the bait station 110. A slot is placed in the top of the bait holder 128, so that the cardboard bait 114 may be placed in the slot at the top of the bait holder 128. Since the cardboard bait 114 is placed in a slot in the top of the bait holder 128, the cardboard bait 114 may be viewed by looking through the transparent top wall 118. In this preferred embodiment, the cardboard bait 114 is formed by a plurality of layers of corrugated cardboard. Corrugated cardboard is formed from a piece of corrugated paper 130 sandwiched between and adhesively connected to layers of flat paper 131. The corrugations in the corrugated paper 130 forms ridges and valleys which form holes between the corrugated paper 130 and the layers of flat paper 131. The ridges and valleys extend away from the top wall 118, so that the operator is able to look through the top wall 118 and down the holes between the corrugated paper 130 and the layers of flat paper 131.

The cap 113 is a triangular end wall. The cap 113 is mechanically connected to the first side wall 116, the second side wall 117, and the top wall 118 by an adhesive, sealing the cardboard bait 114 and the bait holder 128 in the bait station 110.

In operation, the impregnated cardboard bait 114 is placed in the slot on top of the bait holder 128, which is then placed in the tubular body 112. The cardboard bait 114 is positioned, so that the holes caused by the corrugated paper 131 extends from the top wall 118 towards the bottom edge 122, as shown in FIG. 4. The cap 113 is placed over the open end of the tubular body 112, and is mechanically connected to the first, second, and top walls 116, 117, 118 by an adhesive. The bait station 110 is placed horizontally in the ground. The bait station 110 may be pushed directly into soft ground, or a trench The bottom edge 122 is positioned at the bottom of the bait station 110 in the ground, and the top wall 118 is positioned at the top of the bait station 110, slightly above or almost even to the surface of the ground. The triangular cross section makes it easier to place the bait station 110 in the ground.

Once in the ground, the bait station 110 is able to intercept termites which travel underground in a horizontal direction. The termites enter the bait station 110 through the apertures 121, which are holes ⅛ inches in diameter. Once inside, the termites begin to build termite tubes through the bait holder 128 to the cardboard bait 114. The termites eat the cardboard bait 114, taking in the slow acting toxicant. The termites go back to the colony before the slow acting toxicant kills the termite, and share the bait with the rest of the colony. This provides the slow acting toxicant to the colony, thus killing the whole colony.

Therefore the invention provides a means for controlling a termite colony. The controlling of a termite colony means any of the following: the killing of the whole colony, or stopping the destruction caused by the colony, or substantially eliminating the colony.

The corrugation in the cardboard bait 114 enhances the cardboard bait's 114 attractiveness to termites, since it is easier to build termite tubes in the holes formed by the corrugation. In addition, the position of the holes allows one to see through the top wall 118 and inspect the cardboard bait 114 for the presence of termites and termite tubes without moving or touching the cardboard bait 114 or station 110. The horizontal positioning also allows the easy inspection of the cardboard bait 114, which cannot be done with bait stations where the length of the station is positioned vertically in the ground.

Because termites tend to travel horizontally, just below the surface of the ground, placing the length of the bait station 110 horizontally, allows the bait station 110 to provide a greater area of protection. A plurality of bait stations 110 may be placed end to end to provide a linear barrier, such as a circle around a house. In addition to making it easier to place the bait station 110 in the ground, the triangular cross section and the absence of uncovered holes in the top wall 118 helps to keep water from reaching the apertures in the first and second side walls 116,117. The apertures in the end wall 125 are angled downward, so that water passing downward from the surface of the ground to the bottom edge 122 on the out side of the station will not enter the apertures in the end wall 125.

The bait holder 128 also keeps water away from the cardboard bait 114, preventing the cardboard bait 114 from degrading.

Other embodiments of the invention may provide other types of caps. Such caps may also have apertures. In other embodiments, neither the caps or end walls have apertures. In another embodiment, the adhesive may be replaced by having the parts form a single piece. The adhesive, screw holes, or making a single piece are various ways of mechanically connecting the various parts.

While preferred embodiments of the present invention have been shown and described herein, it will be appreciated that various changes and modifications may be made therein without departing from the spirit of the invention as defined by the scope of the appended claims.

What is claimed is:

1. A bait station, comprising:
    a tubular body, comprising:
        a first side wall with a length and width, and wherein the first side wall has a plurality of apertures;
        a second side wall with a length and width, wherein the first side wall is mechanically connected to the second side wall along an edge along the lengths of the first side wall and the second side wall, and wherein the second side wall has a plurality of apertures;
        a top wall with a length and width, wherein the top wall is mechanically connected to the first side wall along an edge along the lengths of the first side wall and the top wall, and wherein the top wall is mechanically connected to the second side wall along an edge along the lengths of the second side wall and the top wall; and
        an end wall wherein the end wall is mechanically connected to the first side wall along an edge of the first side wall along the width of the first side wall, and wherein the end wall is mechanically connected to the second side wall along an edge of the second side wall along the width of the second side wall, and wherein the end wall is mechanically connected to the top wall along an edge of the top wall along the width of the top wall;
    a cellulose bait impregnated with a toxicant within the tubular body; and
    a cap for covering an open end of the tubular body, wherein said top wall is transparent and said toxicant is selected from the group consisting of boric acid/borate, hydramethylnon, macrolide antibiotics, insect growth regulators, biological agents, and protozoacides.

2. A method for controlling termites in the ground, comprising the steps of:
    placing a cellulose bait impregnated with a toxicant through an open end of a tubular body into the tubular body, wherein the tubular body comprises:
        a first side wall with a length and width and wherein the first side wall has a plurality of apertures;
        a second side wall with a length and width, wherein the first side wall is mechanically connected to the second side wall along an edge along the lengths of the first side wall and the second side wall, and wherein the second side wall has a plurality of apertures;
        a top wall with a length and width, wherein the top wall is mechanically connected to the first side wall along an edge along the lengths of the first side wall and the top wall, and wherein the top wall is mechanically connected to the second side wall along an edge along the lengths of the second side wall and the top wall; and
        an end wall wherein the end wall is mechanically connected to the first side wall along an edge of the first side wall along the width of the first side wall, and wherein the end wall is mechanically connected to the second side wall along an edge of the second side wall along the width of the second side wall, and wherein the end wall is mechanically connected to the top wall along an edge of the top wall along the width of the top wall;
    placing a cap over the open end of the tubular body;

placing the tubular body in the ground so that part of the first side wall and the second side wall are below the surface of the ground, and wherein the length of the top wall is substantially parallel to the surface of the ground and the toxicant is selected from the group consisting of boric acid/borate, hydramethylnon, macrolide antibiotics, insect growth regulators, biological agents, and protozoacides.

3. The method, as claimed in claim 2, wherein the step of placing the tubular body in the ground places the top wall above the surface of the ground.

4. The bait station, as claimed in claim 1, further comprising, means for mechanically connecting the cap to the tubular body.

5. The bait station, as claimed in claim 4, wherein the end wall is triangular, and wherein the cap comprises:

a cap end wall;

an outer flange, mechanically connected to the cap end wall; and a ridge within the outer flange.

6. The bait station as claimed in claim 4, wherein the end wall is a triangular plate and wherein the cap is a triangular plate, and wherein the cap is mechanically connected to the first side wall along an edge of the first side wall along the width of the first side wall, and wherein the end wall is mechanically connected to the second side wall along an edge of the second side wall along the width of the second side wall, and wherein the end wall is mechanically connected to the top wall along an edge of the top wall along the width of the top wall.

7. The bait station, as claimed in claim 6, wherein the end wall has a plurality of apertures and wherein the cap has a plurality of apertures.

8. The bait station, as claimed in claim 7, wherein the plurality of apertures in the end wall are angled downward.

9. The bait station, as claimed in claim 6, wherein the cellulose bait comprises a surface with a plurality of grooves extending substantially along the direction from the edge where the first side wall is mechanically connected to the second side wall to the top wall.

10. The bait station, as claimed in claim 9, wherein the cellulose bait is wood.

11. The bait station, as claimed in claim 5, wherein the cellulose bait comprises a surface with a plurality of grooves extending towards the top wall.

12. The bait station, as claimed in claim 11, wherein the cellulose bait is wood.

13. The bait station, as claimed in claim 1, wherein the cellulose bait comprises a surface with a plurality of grooves extending towards the top wall.

14. The bait station, as claimed in claim 13, wherein the cellulose bait is wood.

15. The bait station, as claimed in claim 1, further comprising, a bait holder within the tubular body and supporting the cellulose bait.

16. The bait station, as claimed in claim 15, wherein the cellulose bait is corrugated cardboard.

17. The bait station, as claimed in claim 16, wherein the bait holder is made of foam, and wherein the cellulose bait extends to a top surface of the bait holder.

18. The method, as claimed in claim 3, further comprising the step of, looking through the top wall to inspect the cellulose bait, while the tubular body is in the ground.

19. The method, as claimed in claim 18, wherein the step of looking through the top wall to inspect the cellulose bait, comprises looking down grooves in the cellulose bait to look for termite tubes in the grooves in the cellulose bait.

20. The method, as claimed in claim 19, further comprising the step of supporting the cellulose bait with a foam bait holder in the tubular body.

* * * * *